United States Patent [19]
George et al.

[11] Patent Number: 5,373,457
[45] Date of Patent: Dec. 13, 1994

[54] METHOD FOR DERIVING A PIECEWISE LINEAR MODEL

[75] Inventors: Binay J. George; Markus Wloka; Sean Tyler, all of Chandler, Ariz.

[73] Assignee: Motorola, Inc., Schaumburg, Ill.

[21] Appl. No.: 38,365

[22] Filed: Mar. 29, 1993

[51] Int. Cl.$^5$ .................. G05B 23/02; G09B 23/18
[52] U.S. Cl. ...................... 364/578; 364/488; 364/489; 364/490; 327/334
[58] Field of Search ............... 364/577, 578, 573, 491, 364/426.02, 715.05, 488, 489, 490; 307/443, 200.1; 73/118.1

[56] References Cited

U.S. PATENT DOCUMENTS

| | | | |
|---|---|---|---|
| 3,935,440 | 1/1976 | Mood et al. ........................ | 364/578 |
| 4,001,569 | 1/1977 | Dickinson et al. .............. | 364/715.05 |
| 4,766,559 | 8/1988 | Dobos et al. ..................... | 364/573 |
| 4,862,018 | 8/1989 | Taylor et al. .................... | 307/443 |
| 4,918,643 | 4/1990 | Wong ............................. | 364/578 |
| 5,079,946 | 1/1992 | Motamedi et al. ................ | 73/118.1 |
| 5,180,214 | 1/1993 | Yeh et al. ...................... | 364/426.02 |
| 5,282,148 | 1/1994 | Poirot et al. ................... | 364/491 |

*Primary Examiner*—Emanuel T. Voeltz
*Assistant Examiner*—Alan Tran
*Attorney, Agent, or Firm*—Robert D. Atkins

[57] ABSTRACT

A method for deriving a piecewise-linear model which comprises measuring the behavior of a desired characteristic of an object. Recording the observations in a computer memory. Creating a piece-wise linear model of the observations based on the highest and lowest valued observations. Computing an error value for the dependent variable of each observation based on the piece-wise linear model. Determining a new piece-wise linear model based on two segments by interpolation. Recursively repeating the steps of computing error values and determining an improved piece-wise linear model until a predetermined acceptance condition is achieved. Performing a computer simulation of the desired characteristic of the object using the improved piecewise-linear model.

8 Claims, 2 Drawing Sheets

METHOD FOR DERIVING A PIECEWISE LINEAR MODEL

BACKGROUND OF THE INVENTION

The present invention relates, in general, to a method for fitting experimentally measured data to a form usable for a computer model, and more particularly to a method for piecewise linear curve fitting for cell characterization in integrated circuit design.

Integrated circuit design often involves large complex circuits having greater than 500,000 transistors. Such complex circuits are greatly simplified by use of techniques such as semicustom design where well understood and characterized building blocks called cells are arranged to obtain the circuit's required functionality. During the design process the propagation delay through any particular cell is predicted by means of a computer simulation. The same cells may be used in different locations throughout the design, may drive different loads, and may be driven by inputs having different speeds. In order to obtain an accurate simulation, the variation in propagation delay caused by each of these factors must be quickly and accurately predicted during the simulation. This may be accomplished in several ways, by actual experimentation with the physical circuit, a detailed analysis based on knowledge of the interior circuitry of the cell, and a detailed simulation using a low level circuit simulator such as the well known SPICE simulator. For example the propagation delay through the cell may be simulated using different values of load capacitance and measuring the simulated delay. The points obtained are then plotted and a curve is drawn through these points according to the user's requirements.

There are numerous methods for using this information to create a computer model which can rapidly and accurately interpolate between these observations. One commonly used method is called a piecewise linear model which approximates the actual variation of the data by a series of straight lines. A piecewise linear model is simple, computes rapidly, and requires minimal computer memory. As a result such a model is widely used for simulating phenomena where no closed form equation is known or where the known equation is complex.

The accuracy of a piecewise linear model is related not only to the number of line segments used, but to the careful selection of the breakpoints where one line ends and another begins. Typically fewer than five segments may model a behavior which is characterized by several hundred observations. The most accurate model would simply be for each observation to become a breakpoint. This is impractical since the computer memory required would be excessive. In addition, the computation required to select the two closest observations for interpolation becomes excessive with large numbers of breakpoints. The prior art includes numerous methods for determining optimal breakpoints, however these are not suited to automatic computation by a computer. According to the prior art, breakpoints are typically determined by estimating the required number of segments, selecting breakpoints, then manually computing the error which occurs at each observed point. The prior art method is tedious and error prone with no guarantee that optimal accuracy will be achieved.

A typical cell library may contain more than 100 cells, each cell having 5 or more parameters to model with each parameter being characterized by more than 100 observation points. Accordingly, there is a need for a solution which computes the breakpoints and selects the numbers of segments which will satisfy a user defined error tolerance. Alternatively derivation of the optimal model for a limited number of segments is required. The solution must be completely automatic and suitable for computer calculation. A useful method must also be suitable for integration into the basic model of a computer simulation system such that the characterization results may be used to provide accurate prediction of results which will be obtained when using the cells in actual designs.

SUMMARY OF THE INVENTION

A method for deriving a piecewise-linear model which comprises measuring the behavior of a desired characteristic of an object. Recording the observations in a computer memory. Creating a piece-wise linear model of the observations based on the highest and lowest valued observations. Computing an error value for the dependent variable of each observation based on the piece-wise linear model. Determining a new piece-wise linear model based on two segments by interpolation. Recursively repeating the steps of computing error values and determining an improved piece-wise linear model until a predetermined acceptance condition is achieved. Performing a computer simulation of the desired characteristic of the object using the improved piecewise-linear model.

DETAILED DESCRIPTION OF THE DRAWINGS

Figure 1:
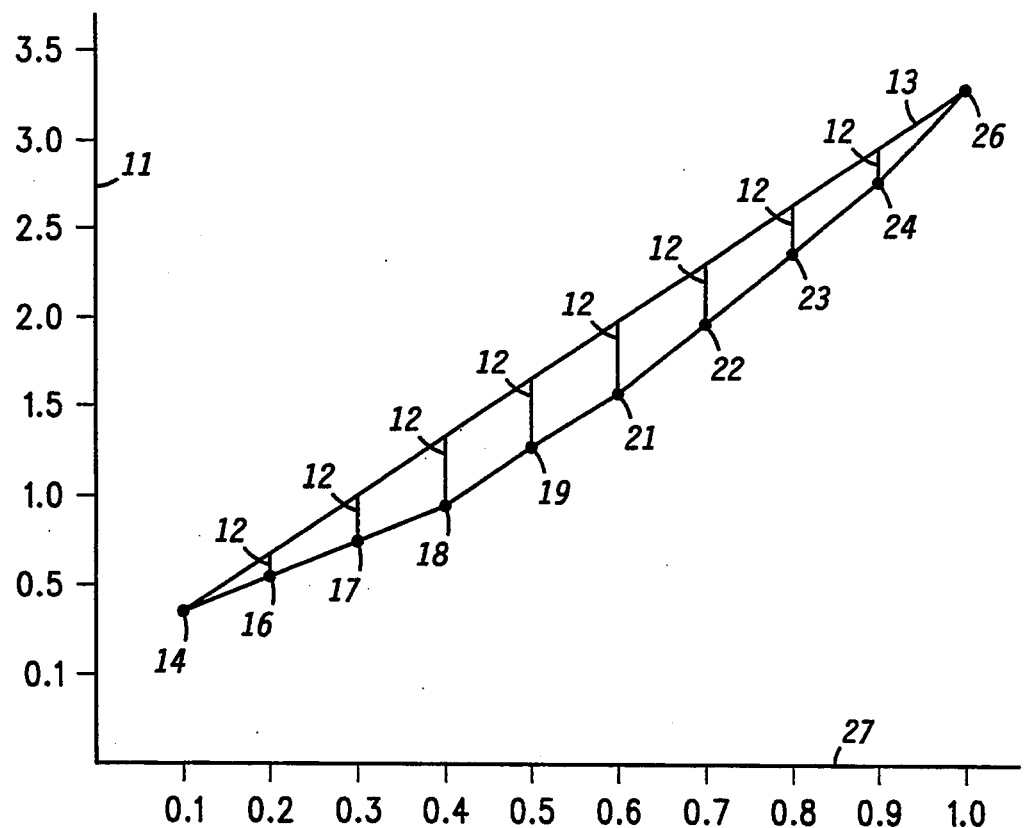
FIG. 1 shows an example of experimental data which illustrates a method as a preferred embodiment in accordance with the present invention.

FIG. 1 shows an example of experimental data which is suited for automatic piecewise linear curve fitting as a preferred embodiment in accordance with the present invention. The example shown in FIG. 1 is simulated data which is representative of measurements obtained by varying the capacitive load on the output of a digital integrated circuit cell while measuring the time taken for a signal to propagate through that cell. When designing and characterizing an integrated circuit cell, a detailed circuit level simulation such as the well known SPICE simulator is generally used to predict experimental results. These results are then typically recorded in a computer memory. The results are then used to automatically create a piecewise linear model for the simulations used in actual designs by use of the method of the preferred embodiment. These results are later confirmed by measurement using actual prototypes or production devices.

While the example shown is drawn from typical characterization of integrated circuit cells it should be understood that the method is also suited for automated modeling of experimental data for a wide variety of physical objects and processes. For example simulations are commonly performed in biological processes in response to variables such as temperature, availability of food, and availability of light. Other examples include performance of airfoils and aircraft characteristics, operation of mechanical devices, and chemical processes. Computer models have found a wide variety of applications and automatic reduction of measured observations to a computer model is useful in most of these applications.

For the example illustrated in FIG. 1 an independent variable 27 represents the load capacitance in picofarads. Independent variable 27 is varied from 0.1 picofarad to 1.0 picofarad in steps of 0.1 picofarad. A dependent variable 11 represents the measured propagation delay through this example cell. Measurements range from 0.42 nanoseconds to 3.3 nanoseconds. This data is summarized in Table 1 below.

TABLE 1

| Load (pf) | Measured Delay (ns) | Computed Delay (ns) | Error (ns) |
|---|---|---|---|
| 0.1 | 0.42 | 0.42 | 0.0 |
| 0.2 | 0.58 | 0.74 | 0.16 |
| 0.3 | 0.78 | 1.06 | 0.28 |
| 0.4 | 0.97 | 1.38 | 0.41 |
| 0.5 | 1.3 | 1.7 | 0.4 |
| 0.6 | 1.62 | 2.02 | 0.4 |
| 0.7 | 1.98 | 2.34 | 0.36 |
| 0.8 | 2.38 | 2.66 | 0.28 |
| 0.9 | 2.82 | 2.98 | 0.16 |
| 1.0 | 3.3 | 3.3 | 0.0 |

The observed results are shown in FIG. 1 as a series of observation points 14, 16, 17, 18, 19, 21, 22, 23, 24, and 26. In order to form a piecewise linear approximation a straight line or chord 13 is drawn between observation point 14, the observation point having the lowest independent value, and observation point 26, the observation point having the highest independent value. A computed delay for each observation point is calculated using Equation 1.

$$D_{comp} = mC_L + K \quad \text{Equation 1}$$

Where:
  $D_{comp}$ = Computed Delay
  m = slope of chord 13
  $C_L$ = Load Capacitance
  K = constant An error value 12 is then calculated for each observation point 16, 17, 18, 19, 21, 22, 23, and 24. Each error value 12 is examined to determine if it exceeds the allowable error tolerance in this example, 0.1 nanoseconds. By inspecting Table 1 it is readily determined that at least one error value 12 exceeds the allowed error tolerance. Accordingly a finer resolution of piecewise linear approximation is required. In the preferred embodiment the midpoint of the line between observation point 14 and observation point 26 as along the axis formed by independent variables 27 is used for a new breakpoint. This breakpoint is computed as:

$$BP = \frac{(BP_{HI} - BP_{LO})}{2} + BP_{LO} \quad \text{Equation 2}$$

Where:

BP = Calculated new breakpoint.
$BP_{HI}$ = High valued current breakpoint.
$BP_{LO}$ = Low valued current breakpoint.

For the example shown in FIG. 1, $BP_{HI}$ is observation point 26, having a load value of 1.0 picofarads and $BP_{LO}$ is observation point 14, having a load value of 0.1 picofarads. Substituting these values in Equation 1 gives BP of 0.55 picofarads. The nearest observation point above this load value is selected, in this case, observation point 21 having a capacitance value of 0.6 picofarads.

Figure 2:
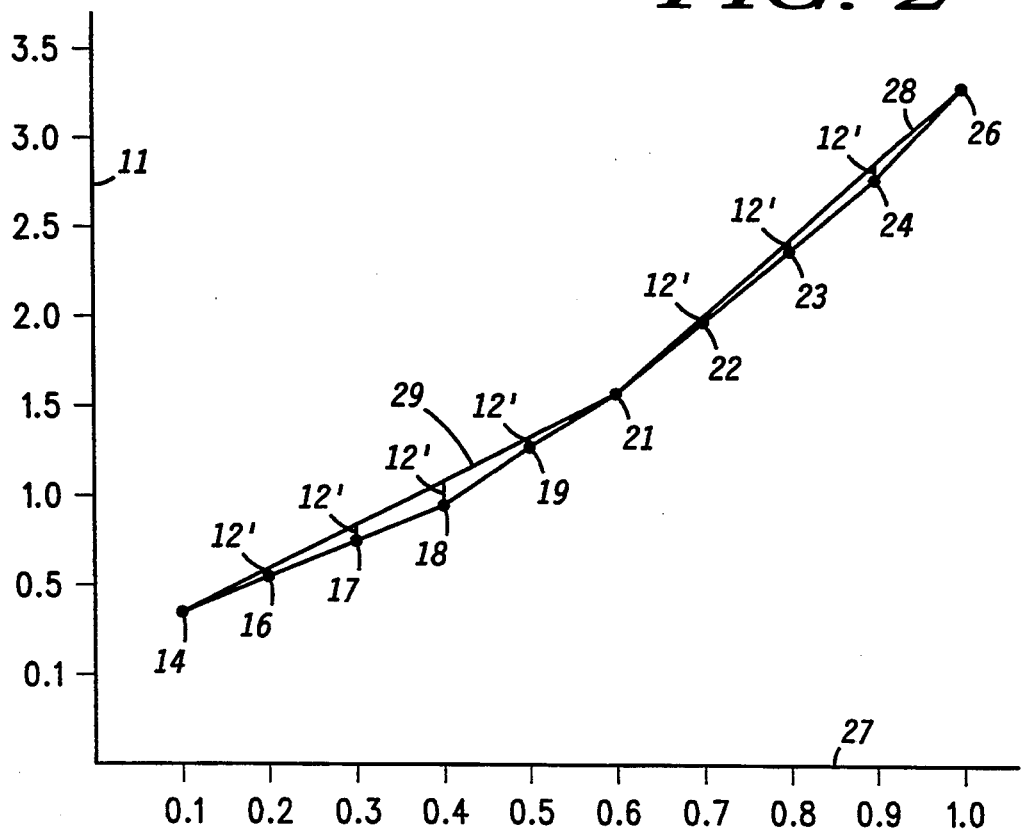
FIG. 2 shows the example of FIG. 1 with a new breakpoint selected as the preferred embodiment in accordance with the present invention.

An alternative embodiment in accordance with the present invention selects the new breakpoint as the observation point having the highest error value. Thus this alternative embodiment would select observation point 18 with an error value of 0.41 nanoseconds. FIG. 2 shows the example of FIG. 1 with a new chord 28 joining observation point 26 and 21. A new chord 29 joins observation point 21 and 14. This is a new piecewise linear approximation based on the selection made by analysis of the example illustrated in FIG. 1. For each of observation points 16, 17, 18, 19, 22, 23, and 24 a new error value 12' is computed an tabulated in Table 2 below. Each error value 12' is then compared to the allowable error tolerance of 0.1 nanoseconds. This determines that chord 28 is within the acceptable error tolerance over the range of observation point 21 to 24 and 26. However, the error value 12' computed for observation point 17 and 18 exceeds the allowable error tolerance. Accordingly a new breakpoint is computed midway along cord 29 as before. In this case observation point 18 is selected as the new breakpoint for a refined piecewise linear approximation.

TABLE 2

| Load (pf) | Measured Delay (ns) | Computed Delay (ns) | Error (ns) |
|---|---|---|---|
| 0.1 | 0.42 | 0.42 | 0.0 |
| 0.2 | 0.58 | 0.66 | 0.08 |
| 0.3 | 0.78 | 0.9 | 0.12 |
| 0.4 | 0.97 | 1.14 | 0.17 |
| 0.5 | 1.3 | 1.38 | 0.08 |
| 0.6 | 1.62 | 1.62 | 0.0 |
| 0.7 | 1.98 | 2.04 | 0.04 |
| 0.8 | 2.38 | 2.46 | 0.08 |
| 0.9 | 2.82 | 2.88 | 0.06 |
| 1.0 | 3.3 | 3.3 | 0.0 |

Figure 3:
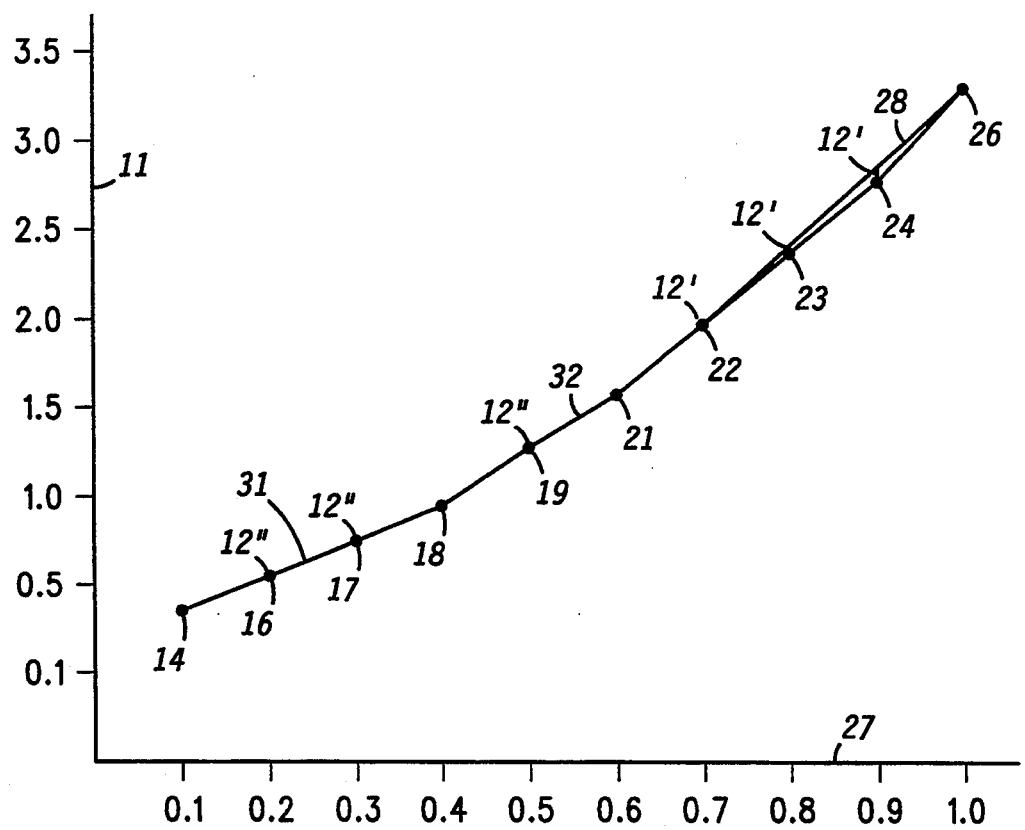
FIG. 3 shows the example of FIG. 2 with a third breakpoint selected as the preferred embodiment in accordance with the present invention.

FIG. 3 shows the example of FIG. 2 with a piecewise linear approximation based on a new breakpoint at observation point 18. A chord 32 joins observation points 18 and 21. A chord 31 joins observation points 14 and 18. New error values 12" are computed for observation points 16, 17, and 19. All error values 12" are now less than the allowable error tolerance as shown in Table 3. Accordingly a piecewise linear model may be constructed using chords 31, 32, and 28 with confidence that the maximum error is less than the acceptable error tolerance of 0.1 nanoseconds.

The piecewise linear model is then typically incorporated into a computer simulation by building a table which defines the endpoints of chords 31, 32, and 28. Typically this is accomplished by specifying coordinates for these endpoints in terms of independent variable and dependent variable for each chord. The simulation interpolates between the endpoints to determine the exact values required for the simulation.

TABLE 3

| Load (pf) | Measured Delay (ns) | Computed Delay (ns) | Error (ns) |
| --- | --- | --- | --- |
| 0.1 | 0.42 | 0.42 | 0.0 |
| 0.2 | 0.58 | 0.6 | 0.02 |
| 0.3 | 0.78 | 0.79 | 0.01 |
| 0.4 | 0.97 | 0.97 | 0.0 |
| 0.5 | 1.3 | 1.30 | 0.0 |
| 0.6 | 1.62 | 1.62 | 0.0 |
| 0.7 | 1.98 | 2.04 | 0.04 |
| 0.8 | 2.38 | 2.46 | 0.08 |
| 0.9 | 2.82 | 2.88 | 0.06 |
| 1.0 | 3.3 | 3.3 | 0.0 |

Figure 4:
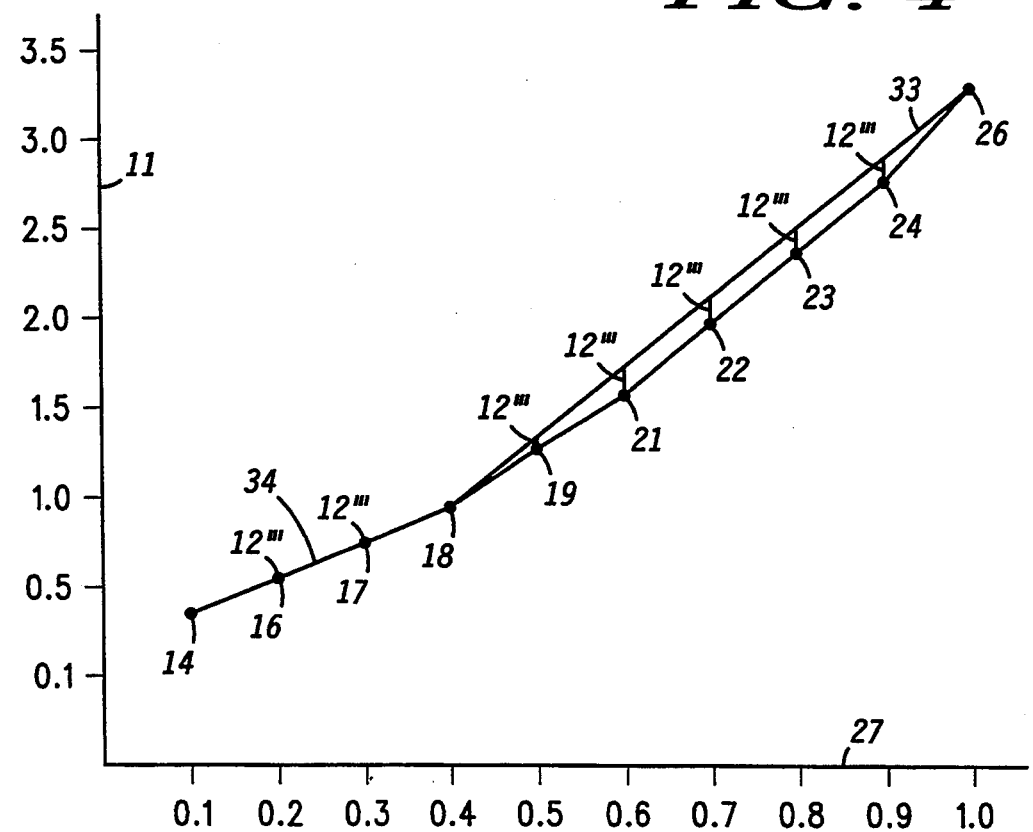
FIG. 4 shows the example of FIG. 1 with a new breakpoint selected as an alternative preferred embodiment in accordance with the present invention.

FIG. 4 shows the example of FIG. 1 except that a method of an alternative preferred embodiment is used. Often the model is constrained to use a certain maximum number of chords with the minimum possible error. In other words, the best solution within computational and memory constraints. According to the alternative preferred embodiment, error values 12 (FIG. 1) are inspected to find the maximum error. The point at which this occurs, in this example observation point 18, is used as a new breakpoint to construct an improved piecewise linear approximation. A chord 34 connects observation points 14 and 18. A chord 33 connects observation points 18 and 26. A new set of error values 12'''0 is calculated for observation points 16, 17, 19, 21, 22, 23, and 24.

By now it should be clear that the present invention provides a method for automatically deriving the number of segments and computing appropriate breakpoints with which to build a piecewise linear model for simulation. Alternatively the optimal model, that is having the minimum possible error for a limited number of segments can be derived. The method is completely automatic and is highly suited for computer calculation. By building a table of variables the method may be readily used to integrate the custom piecewise linear model into the basic model of a computer simulation system such that the characterization results may be used to provide accurate prediction of results which will be obtained in using the cells in actual designs.

We claim:

1. A method executed by a computer for creating a piecewise-linear model of an integrated circuit, comprising the steps of:
    observing an independent variable that is independent of a physical process and a dependent variable that is dependent on said physical process during design of the integrated circuit to determine a plurality of observed values of said independent variable and a plurality of observed values of said dependent variable;
    plotting said plurality of observed values of said independent variable against said plurality of observed values of said dependent variable;
    connecting a first chord between a lowest observed value of said dependent variable and a highest observed value of said dependent variable to create a piecewise-linear model;
    determining a first error value between a plurality of computed values of said dependent variable based on said first chord and each of said plurality of observed values of said dependent variable that are located between said lowest and highest observed values of said dependent variable;
    comparing said first error values against a predetermined tolerance; and
    placing a first breakpoint at a midway point of said plurality of observed values of said dependent variable if one of said first error values is greater than said predetermined tolerance to form a second chord between said lowest observed value of said dependent variable and said first breakpoint and a third chord between said first breakpoint and said highest observed value of said dependent variable.

2. The method of claim 1 further including the step of determining a second error value between a plurality of computed values of said dependent variable based on said second chord and each of said plurality of observed values of said dependent variable that are located between said lowest observed value of said dependent variable and said first breakpoint.

3. The method of claim 2 further including the step of comparing said second error values against said predetermined tolerance.

4. The method of claim 3 further including the step of placing a second breakpoint at a midway point between said lowest observed value of dependent variables and said first breakpoint if one of said second error values is greater than said predetermined tolerance to form a fourth chord between said lowest observed value of said dependent variable and said second breakpoint and a fifth chord between said second breakpoint and said first breakpoint.

5. A method executed by a computer for creating a piecewise-linear model of an integrated circuit, comprising the steps of:
    observing an independent variable that is independent of a physical process and a dependent variable that is dependent of said physical process during design of the integrated circuit to determine a plurality of observed values of said independent variable and a plurality of observed values of said dependent variable;
    plotting said plurality of observed values of said independent variable against said plurality of observed values of said dependent variable;
    connecting a first chord between a lowest observed value of said dependent variable and a highest observed value of said dependent variable to create a piecewise-linear model;
    determining a first error value between a plurality of computed values of said dependent variable based on said first chord and each of said plurality of observed values of said dependent variable that are located between said lowest and highest observed values of said dependent variable;
    comparing said first error values against a predetermined tolerance; and
    placing a first breakpoint at a highest one of said first error values if one of said first error values is greater than said predetermined tolerance to form a second chord between said lowest observed value of said dependent variable and said first breakpoint and a third chord between said first breakpoint and said highest observed value of said dependent variable.

6. The method of claim 5 further including the step of determining a second error value between a plurality of computed values of said dependent variable based on said second chord and each of said plurality of observed values of said dependent variable that are located between said lowest observed value of said dependent variable and said first breakpoint.

7. The method of claim 6 further including the step of comparing said second error values against said predetermined tolerance.

8. The method of claim 7 further including the step of placing a second breakpoint at a highest one of said second error values if one of said second error values is greater than said predetermined tolerance to form a fourth chord between said lowest observed value of said dependent variable and said second breakpoint and a fifth chord between said second breakpoint and said first breakpoint.

* * * * *